UNITED STATES PATENT OFFICE.

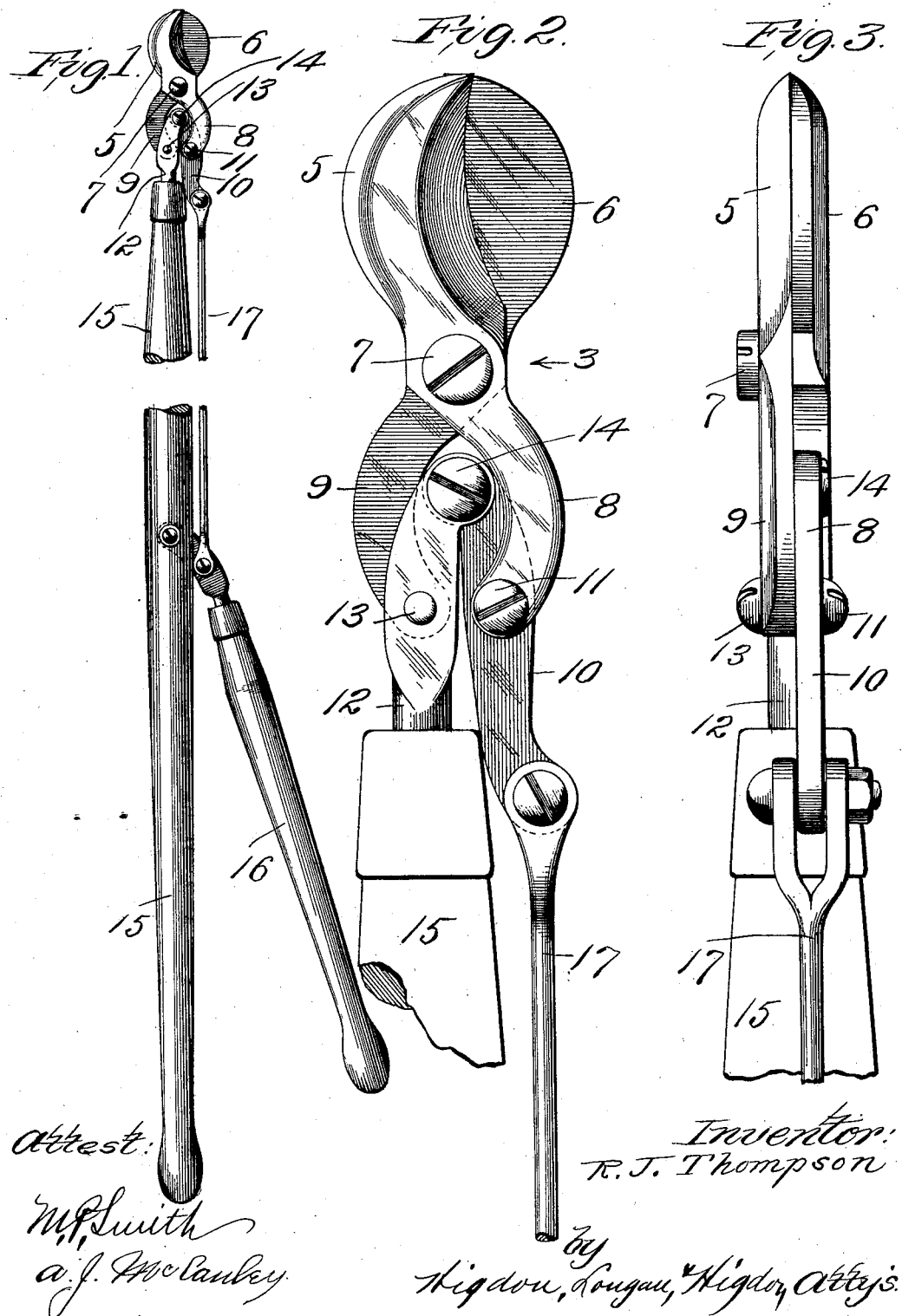

ROBERT J. THOMPSON, OF GRANDIN, MISSOURI.

HANDLE FOR PRUNING-SHEARS.

SPECIFICATION forming part of Letters Patent No. 608,491, dated August 2, 1898.

Application filed September 7, 1897. Serial No. 650,849. (No model.)

*To all whom it may concern:*

Be it known that I, ROBERT J. THOMPSON, of the city of Grandin, Carter county, State of Missouri, have invented certain new and useful Improvements in Handles for Pruning-Shears, of which the following is a full, clear, and exact description, reference being had to the accompanying drawings, forming a part thereof.
My invention relates to handles for pruning-shears and the like; and it consists of the novel construction, combination, and arrangement of parts hereinafter shown, described, and claimed.
Figure 1 is a side elevation of a pruning-shears constructed in accordance with the principles of my invention. Fig. 2 is a view analogous to Fig. 1, upon an enlarged scale, parts being broken away to economize space.
Fig. 3 is an edge view taken looking in the direction indicated by the arrow 3 in Fig. 2.

Referring by numerals to the drawings, 5 and 6 are the jaws, upon which the cutting edges are formed, said jaws being pivotally connected by means of the screw 7, as required to form a shears. An arm 8 extends from the jaw 5, and a similar arm 9 extends from the jaw 6. The lever 10 is pivotally connected to the free end of the arm 8 by means of the screw 11, and a similar lever 12 is pivotally connected to the free end of the arm 9 by means of the screw 13, and the short ends of the levers 10 and 12 are connected by means of the screw 14, said screw 14 being located between the screw 7 and the screws 11 and 13 and between the arms 8 and 9.

The handle 15 is attached to the long end of the lever 12. A second handle 16 is pivotally attached to the handle 15 near its center, and a connecting-rod 17 connects the free end of the lever 10 with the handle 16 at a point intermediate of its ends and near its pivot.

When the handle 16 is operated and swung away from the handle 15, the jaws 5 and 6 will open, and when said handle 16 is drawn toward the handle 15 the jaws 5 and 6 will close, as in a shears.

It is obvious that the jaws 5 and 6 may be constructed for punching, pinching, &c., without departing from the spirit of my invention.

I claim—

In a device of the class described, the arms 8 and 9 pivotally connected, and having cutting-jaws 5 and 6 respectively formed thereon, the lever 10 pivotally connected to the free end of the arm 8, the lever 12 pivotally connected to the free end of the arm 9, a pivotal connection between said levers 10 and 12 at a point between the arms 8 and 9 and the pivotal connections between said levers and said arms, a handle attached to the long end of the arm 12, a second handle pivotally connected to the first-mentioned handle at a point intermediate of its ends, and a connecting-rod connecting the said second handle to the free end of the lever 10, substantially as specified.

In testimony whereof I affix my signature in presence of two witnesses.

ROBERT J. THOMPSON.

Witnesses:
A. C. TOLIVER,
JOHN MCDERMOTT.